US009027768B2

(12) United States Patent
Hagadorn et al.

(10) Patent No.: US 9,027,768 B2
(45) Date of Patent: May 12, 2015

(54) PRESCRIPTION BOTTLE STORAGE UNITS AND MEDICAL ORGANIZER CASES

(76) Inventors: Colleen A. Hagadorn, Queensbury, NY (US); Kathleen A. Bauer, Brant Lake, NY (US)

( * ) Notice: Subject to any disclaimer, the term of this patent is extended or adjusted under 35 U.S.C. 154(b) by 98 days.

(21) Appl. No.: 13/365,894

(22) Filed: Feb. 3, 2012

(65) Prior Publication Data

US 2012/0200209 A1 Aug. 9, 2012

Related U.S. Application Data

(63) Continuation-in-part of application No. 13/021,297, filed on Feb. 4, 2011, now Pat. No. 8,950,601.

(51) Int. Cl.

| | |
|---|---|
| ***A47F 5/02*** | (2006.01) |
| ***A47F 3/14*** | (2006.01) |
| ***A47J 47/00*** | (2006.01) |
| ***A47B 67/02*** | (2006.01) |
| ***A47B 49/00*** | (2006.01) |
| *A45C 13/02* | (2006.01) |
| *A61J 1/16* | (2006.01) |
| *A61J 7/04* | (2006.01) |

(52) U.S. Cl.

CPC . *A47B 67/02* (2013.01); *A47F 5/02* (2013.01); *A47B 49/004* (2013.01); *A45C 13/02* (2013.01); *A61J 1/16* (2013.01); *A61J 7/04* (2013.01)

(58) Field of Classification Search

CPC ................................ A47B 67/02; A47B 49/00
USPC ..................... 211/10, 74, 75, 77, 85.18, 59.3; 220/559, 578, 810, 212.5; 206/438, 206/534, 538, 539, 570; 312/9.7, 9.8, 9.46, 312/125, 135, 234, 280, 249.2, 249.6, 283, 312/285, 290, 305

See application file for complete search history.

(56) References Cited

U.S. PATENT DOCUMENTS

| | | | | |
|---|---|---|---|---|
| 68,073 | A * | 8/1867 | Haynes et al. | 312/209 |
| 350,523 | A * | 10/1886 | Bodley | 211/65 |
| 503,306 | A | 8/1893 | Bever | |
| 559,709 | A | 5/1896 | Hoff | |

(Continued)

FOREIGN PATENT DOCUMENTS

| | | |
|---|---|---|
| CN | 201160808 | 12/2008 |
| CN | 201316198 | 9/2009 |

(Continued)

OTHER PUBLICATIONS

Tabletop Spinning Cosmetic Organizer, by Lori Greiner, available from QVC, West Chester, Pennsylvania, printout available online on Jan. 23, 2013, at http://www.qvc.com/Tabletop-Spinning-Cosmetic-Organizer-by-Lori-Greiner.product.H164200.html, 2-page, Dec. 8, 2009.

(Continued)

*Primary Examiner* — Daniel J Troy
*Assistant Examiner* — Kimberley S Wright
(74) *Attorney, Agent, or Firm* — Heslin Rothenberg Farley & Mesiti P.C.

(57) ABSTRACT

A prescription bottle storage unit for holding a plurality of prescription pill bottles includes a holder for holding the plurality of prescription pill bottles in fixed positions spaced-apart around a vertically-extending axis so that outwardly-extending side portions of the plurality of prescription pill bottles are observable.

25 Claims, 14 Drawing Sheets

(56) References Cited

U.S. PATENT DOCUMENTS

| | | | | | |
|---|---|---|---|---|---|
| 620,013 | A | | 2/1899 | Barnes | |
| 657,463 | A | | 9/1900 | Simpson | |
| 770,903 | A | * | 9/1904 | Holt | 108/94 |
| 770,904 | A | * | 9/1904 | Holt | 211/131.1 |
| 838,294 | A | | 12/1906 | Zeiner | |
| 872,942 | A | | 12/1907 | Hutcheson et al. | |
| 938,809 | A | | 11/1909 | Alexander et al. | |
| 954,793 | A | | 4/1910 | Graham | |
| 954,805 | A | | 4/1910 | Hitchcock | |
| 962,376 | A | | 6/1910 | Miller | |
| 970,522 | A | | 9/1910 | Lundstrom | |
| 1,154,815 | A | | 9/1915 | Solderberg | |
| 1,330,181 | A | | 2/1920 | Gibbs | |
| 1,412,664 | A | | 4/1922 | May | |
| 1,508,204 | A | * | 9/1924 | Walker | 206/581 |
| 1,581,749 | A | | 4/1926 | Mahony | |
| 1,678,357 | A | | 7/1928 | Sampson, Sr. | |
| 1,703,987 | A | | 3/1929 | Butler | |
| 1,732,131 | A | | 10/1929 | Mahaffey | |
| 1,963,544 | A | | 6/1934 | Burt | |
| 1,991,306 | A | * | 2/1935 | Woolsey | 132/312 |
| 2,008,335 | A | | 7/1935 | Nuyts | |
| 2,070,168 | A | * | 2/1937 | King | 312/71 |
| 2,212,129 | A | | 8/1940 | Rust | |
| 2,253,181 | A | * | 8/1941 | Jordan | 108/59 |
| 2,305,958 | A | | 12/1942 | Feick | |
| 2,318,122 | A | | 5/1943 | Williams | |
| 2,545,844 | A | | 3/1951 | Cougias | |
| 2,600,770 | A | | 6/1952 | Hofacer | |
| 2,630,362 | A | * | 3/1953 | Bass | 312/285 |
| 2,678,253 | A | | 5/1954 | Rosenberg | |
| 2,728,488 | A | | 12/1955 | Hankins | |
| 2,911,107 | A | | 11/1959 | Francavillo | |
| 2,936,897 | A | | 5/1960 | Bloch | |
| 3,028,014 | A | | 4/1962 | Southwick | |
| 3,034,657 | A | * | 5/1962 | Newmyer et al. | 211/77 |
| 3,225,913 | A | | 12/1965 | Lee | |
| 3,286,848 | A | | 11/1966 | Galli | |
| 3,378,134 | A | | 4/1968 | Wilkinson et al. | |
| 3,417,873 | A | | 12/1968 | Leptrone | |
| 3,478,890 | A | * | 11/1969 | Ivor | 211/37 |
| 3,862,787 | A | | 1/1975 | Hilsinger | |
| 3,889,817 | A | | 6/1975 | Berkman | |
| 3,942,647 | A | | 3/1976 | Crosslen | |
| 3,957,159 | A | | 5/1976 | Radek | |
| 4,079,841 | A | | 3/1978 | Castel | |
| D248,067 | S | | 6/1978 | Leath | |
| 4,118,002 | A | | 10/1978 | Bartlett | |
| 4,126,366 | A | | 11/1978 | Handler et al. | |
| 4,140,223 | A | | 2/1979 | Rau et al. | |
| 4,204,602 | A | | 5/1980 | Dunchock | |
| 4,210,186 | A | | 7/1980 | Belenson | |
| 4,286,717 | A | * | 9/1981 | Liesinger | 211/70.6 |
| 4,300,809 | A | | 11/1981 | Brownlee | |
| 4,327,836 | A | | 5/1982 | Okuno | |
| 4,334,617 | A | | 6/1982 | Rossmo | |
| 4,339,164 | A | | 7/1982 | Spevak | |
| D267,847 | S | | 2/1983 | Pielert | |
| 4,422,555 | A | | 12/1983 | Jacobs | |
| 4,453,640 | A | | 6/1984 | Cillario | |
| 4,523,702 | A | * | 6/1985 | Viio | 224/101 |
| 4,541,540 | A | | 9/1985 | Gretz et al. | |
| 4,550,828 | A | | 11/1985 | Baldwin et al. | |
| 4,560,072 | A | | 12/1985 | Burrell | |
| 4,609,975 | A | | 9/1986 | Badolato et al. | |
| D291,637 | S | | 9/1987 | Burin | |
| 4,697,856 | A | | 10/1987 | Abraham | |
| 4,700,829 | A | * | 10/1987 | Goodyear | 206/214 |
| 4,700,850 | A | | 10/1987 | Morgan et al. | |
| 4,738,038 | A | | 4/1988 | Tanne et al. | |
| 4,753,340 | A | | 6/1988 | Blakeman et al. | |
| 4,770,314 | A | | 9/1988 | Giesler | |
| 4,796,960 | A | * | 1/1989 | Candelas | 312/305 |
| 4,819,815 | A | | 4/1989 | Tarlow et al. | |
| 4,850,658 | A | | 7/1989 | Sandor | |
| D302,908 | S | | 8/1989 | Hwang | |
| 4,875,744 | A | | 10/1989 | Wettstein | |
| 4,884,713 | A | | 12/1989 | Handler | |
| 4,944,924 | A | | 7/1990 | Mawhirt et al. | |
| 4,962,860 | A | | 10/1990 | Lehmann | |
| 4,999,943 | A | | 3/1991 | Crabtree | |
| D320,141 | S | | 9/1991 | Farrell | |
| D324,141 | S | | 2/1992 | Wu | |
| 5,105,919 | A | | 4/1992 | Bomes et al. | |
| D327,820 | S | | 7/1992 | Ancona et al. | |
| 5,158,345 | A | | 10/1992 | Baur | |
| 5,160,101 | A | * | 11/1992 | Ferraro et al. | 244/118.1 |
| 5,183,165 | A | | 2/1993 | Acona et al. | |
| D334,510 | S | | 4/1993 | Ancona et al. | |
| D334,873 | S | | 4/1993 | Ancona et al. | |
| 5,255,801 | A | | 10/1993 | Berger | |
| 5,285,103 | A | | 2/1994 | Chen et al. | |
| 5,289,940 | A | | 3/1994 | Wisenbaugh | |
| D347,769 | S | | 6/1994 | Kibbe | |
| D348,364 | S | | 7/1994 | Engel | |
| 5,333,745 | A | | 8/1994 | Lehmann | |
| 5,335,985 | A | | 8/1994 | Baur | |
| 5,346,079 | A | | 9/1994 | Price et al. | |
| 5,390,791 | A | * | 2/1995 | Yeager | 206/438 |
| 5,405,193 | A | | 4/1995 | Herrenbruck | |
| 5,564,578 | A | | 10/1996 | Smith | |
| 5,613,614 | A | * | 3/1997 | Richardson | 211/89.01 |
| 5,622,010 | A | | 4/1997 | Weber | |
| 5,678,908 | A | | 10/1997 | Wang | |
| D394,575 | S | * | 5/1998 | Mikloczak et al. | D6/552 |
| 5,772,054 | A | | 6/1998 | Potter | |
| D401,483 | S | | 11/1998 | Porcelli | |
| 5,855,281 | A | | 1/1999 | Rabas | |
| D413,491 | S | | 9/1999 | McCauley | |
| D426,062 | S | | 6/2000 | Shui-Shang | |
| 6,179,102 | B1 | | 1/2001 | Weber et al. | |
| 6,182,839 | B1 | | 2/2001 | Robbins et al. | |
| 6,189,710 | B1 | | 2/2001 | Mason | |
| 6,206,493 | B1 | | 3/2001 | Sanchez-Levin et al. | |
| 6,401,993 | B1 | | 6/2002 | Andrino | |
| 6,439,406 | B1 | | 8/2002 | Duhon | |
| 6,464,506 | B1 | * | 10/2002 | Welles | 434/238 |
| 6,502,707 | B1 | | 1/2003 | Sullivan | |
| 6,595,375 | B2 | | 7/2003 | McConnell | |
| 6,752,281 | B1 | | 6/2004 | Mason et al. | |
| 6,761,266 | B2 | | 7/2004 | Popish | |
| 6,808,077 | B2 | | 10/2004 | McConnell | |
| D498,982 | S | | 11/2004 | Hockey | |
| 6,910,748 | B1 | | 6/2005 | Fountain | |
| 6,935,133 | B2 | * | 8/2005 | Keeter et al. | 62/371 |
| 6,955,268 | B2 | | 10/2005 | Waldron | |
| 6,994,194 | B2 | | 2/2006 | Smith | |
| D526,533 | S | | 8/2006 | Burnett et al. | |
| 7,111,733 | B1 | | 9/2006 | Foote | |
| D535,475 | S | | 1/2007 | Delafontaine | |
| 7,229,143 | B2 | | 6/2007 | Gilman | |
| 7,234,254 | B2 | | 6/2007 | Schmidt | |
| 7,275,647 | B1 | | 10/2007 | Thompson | |
| D561,539 | S | | 2/2008 | Snider et al. | |
| 7,533,776 | B2 | | 5/2009 | Nickerson | |
| 7,565,979 | B1 | * | 7/2009 | Gibson | 206/570 |
| 7,568,582 | B1 | | 8/2009 | Berger | |
| 7,571,811 | B2 | | 8/2009 | Mulaw | |
| 7,584,849 | B2 | * | 9/2009 | Mauk | 206/570 |
| 7,607,541 | B2 | | 10/2009 | Girgis et al. | |
| 7,789,473 | B2 | | 9/2010 | Loewen | |
| 7,926,661 | B2 | * | 4/2011 | Beeman | 206/572 |
| 8,006,846 | B2 | | 8/2011 | Robertson | |
| 8,127,943 | B2 | | 3/2012 | Takashima et al. | |
| 8,292,096 | B2 | | 10/2012 | Thompson | |
| 8,302,787 | B2 | | 11/2012 | Tobey et al. | |
| 8,511,487 | B2 | | 8/2013 | Andersen et al. | |
| 8,534,472 | B2 | | 9/2013 | Levine et al. | |
| 8,550,251 | B1 | * | 10/2013 | Ford | 206/570 |
| 8,640,891 | B2 | | 2/2014 | Buttigieg | |
| 2003/0173361 | A1 | | 9/2003 | Lee | |
| 2004/0168954 | A1 | * | 9/2004 | Hannan et al. | 206/594 |
| 2005/0121121 | A1 | | 6/2005 | Wang | |
| 2006/0070901 | A1 | | 4/2006 | Adams et al. | |

(56) References Cited

U.S. PATENT DOCUMENTS

| | | | | |
|---|---|---|---|---|
| 2006/0207950 | A1 | 9/2006 | Kiehnau et al. | |
| 2007/0056916 | A1* | 3/2007 | Marano | 211/10 |
| 2007/0084742 | A1* | 4/2007 | Miller et al. | 206/438 |
| 2007/0119806 | A1 | 5/2007 | Le Sech | |
| 2007/0262683 | A1 | 11/2007 | Creed | |
| 2008/0093254 | A1 | 4/2008 | Girgis et al. | |
| 2008/0121554 | A1 | 5/2008 | Townsend | |
| 2009/0010575 | A1 | 1/2009 | Sanka | |
| 2009/0152159 | A1* | 6/2009 | Beeman | 206/570 |
| 2009/0223915 | A1 | 9/2009 | Thompson | |
| 2010/0059560 | A1 | 3/2010 | Lanum | |
| 2010/0071395 | A1 | 3/2010 | Ledoux et al. | |
| 2010/0230368 | A1 | 9/2010 | Slade | |
| 2011/0017624 | A1* | 1/2011 | Robertson | 206/438 |
| 2011/0031199 | A1* | 2/2011 | Tobey et al. | 211/131.1 |
| 2011/0062094 | A1 | 3/2011 | Levine et al. | |
| 2011/0121697 | A1 | 5/2011 | Greiner | |
| 2012/0195525 | A1 | 8/2012 | Sabounjian | |
| 2013/0220850 | A1* | 8/2013 | Wingate, III | 206/223 |
| 2013/0228408 | A1 | 9/2013 | Lease et al. | |
| 2013/0233741 | A1* | 9/2013 | Caruth | 206/232 |
| 2014/0014603 | A1 | 1/2014 | Thompson | |

FOREIGN PATENT DOCUMENTS

| | | |
|---|---|---|
| FR | 2583389 | 12/1986 |
| GB | 2249262 | 5/1992 |
| GB | 2448156 | 10/2008 |
| SE | 514112 | 1/2001 |

OTHER PUBLICATIONS

Swivel Store®—Space Saving Organizer!, available from www.BuySwivelStore.conn, 6-pages, at least as early as Nov. 18, 2010.

SpiceStack 18-Bottle Flip-Down Cabinet Organizer, available from QVC West Chester, Pennsylvania and online at QVC.com, 7-pages, at least as early as Feb. 25, 2009.

MedValet Medications Organizer, available from CoKel LLC, Arlington Heights, IL, 2-pages, at least as early as Sep. 18, 2006.

Hagadorn et al., U.S. Appl. No. 13/021,297, filed Feb. 4, 2011, entitled "Prescription Bottle Storage Units and Medical Organizer Cases", and Preliminary Amendment filed Feb. 3, 2012, 42-pages.

Hagadorn et al., U.S. Appl. No. 13/804,385, filed Mar. 14, 2013.

Office Action in U.S. Appl. No. 13/021,297. dated Apr. 3, 2014; pp. 1-15.

* cited by examiner

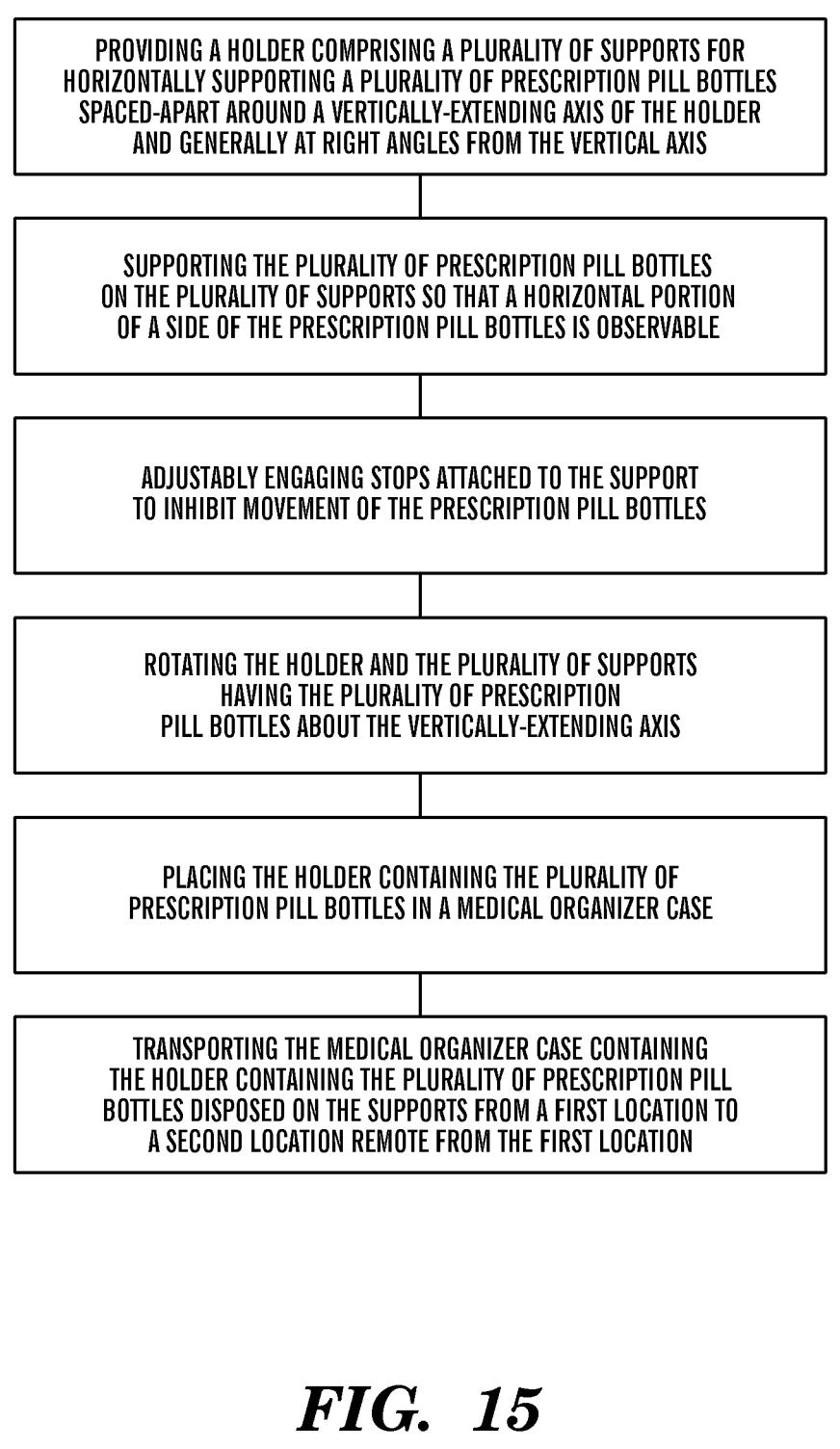

PROVIDING A HOLDER COMPRISING A PLURALITY OF SUPPORTS FOR HORIZONTALLY SUPPORTING A PLURALITY OF PRESCRIPTION PILL BOTTLES SPACED-APART AROUND A VERTICALLY-EXTENDING AXIS OF THE HOLDER AND GENERALLY AT RIGHT ANGLES FROM THE VERTICAL AXIS

SUPPORTING THE PLURALITY OF PRESCRIPTION PILL BOTTLES ON THE PLURALITY OF SUPPORTS SO THAT A HORIZONTAL PORTION OF A SIDE OF THE PRESCRIPTION PILL BOTTLES IS OBSERVABLE

ADJUSTABLY ENGAGING STOPS ATTACHED TO THE SUPPORT TO INHIBIT MOVEMENT OF THE PRESCRIPTION PILL BOTTLES

ROTATING THE HOLDER AND THE PLURALITY OF SUPPORTS HAVING THE PLURALITY OF PRESCRIPTION PILL BOTTLES ABOUT THE VERTICALLY-EXTENDING AXIS

PLACING THE HOLDER CONTAINING THE PLURALITY OF PRESCRIPTION PILL BOTTLES IN A MEDICAL ORGANIZER CASE

TRANSPORTING THE MEDICAL ORGANIZER CASE CONTAINING THE HOLDER CONTAINING THE PLURALITY OF PRESCRIPTION PILL BOTTLES DISPOSED ON THE SUPPORTS FROM A FIRST LOCATION TO A SECOND LOCATION REMOTE FROM THE FIRST LOCATION

*FIG. 15*

PRESCRIPTION BOTTLE STORAGE UNITS AND MEDICAL ORGANIZER CASES

CROSS-REFERENCE TO RELATED APPLICATION

This application is a continuation-in-part of U.S. patent application Ser. No. 13/021,297, filed Feb. 4, 2011, entitled "Prescription Bottle Storage Units And Medical Organizer Cases," the entire subject matter of which is incorporated herein by reference.

FIELD OF THE INVENTION

This invention relates generally to holders for prescription pill bottles, and more specifically, to prescription pill bottle holder and medical organizer cases therefor.

BACKGROUND OF THE INVENTION

U.S. Patent Application Publication No. 2009/0010575 by Sanka discloses a bag that holds pill-organizers within, which together serve as a rolodex of pill organizers, and accommodates several pill organizers that are commercially available in the market in an orderly and secure manner. The bag of pill organizers can be easily carried in one's hand or on the shoulder with a shoulder-strap while on a visit to the doctor or medical professional for a visual examination of pills not yet consumed and any changes in medication. The bag can also be carried as a travel accessory during a user's trip such as on a cruise, and can have various ornamental designs to serve as identifiers and to cater to the preferences of users. The bag fills the need for a simple tool to organize pills and remove the pain of taking pills even while traveling. A round organizer is illustrated in FIG. 8 of Sanka.

U.S. Pat. No. 7,111,733 issued to Foote discloses a prescription pill container organizer and carrier which includes one or more rows of elastic loop holders attached to the inside of a piece of flexible material in which are held prescription pill containers, the piece folded or rolled up to enclose the prescription pill containers. Pockets for documents and a tethered magnifier for reading the prescription pill container labels are also installed next to the rows of holders.

U.S. Pat. No. 6,464,506 issued to Welles discloses a medication compliance organizer having a magnetized panel that may be conveniently mounted on the front of an appliance such as a refrigerator, or alternatively conventionally hung on a wall or other suitable surface. The organizer includes a plurality of day and time based containers for organizing and releasably holding the medications, typically four vials in vertical columns for each day of the week, one for each prescription time interval, i.e. morning, noon, evening and bedtime. The individual containers are sufficiently large to handle the varying medication formats from tablets, elixirs and patches. The organizer further includes an open tray for holding other medications and peripheral supplies, a reminder area for writing reminders regarding specific medications or activities, and medical forms for reference by the patient, care givers and health care personnel.

U.S. Pat. No. D334,873 issued to Ancona et al. discloses a spice rack which supports a spice container along the length of the container.

U.S. Pat. No. D347,769 issued to Kibbe discloses a combined revolving spice rack and spice grinder container.

Chinese Application Publication No. 201160808 discloses an integral condiment frame which comprises a bracket with support legs. More than two spice vessels are symmetrically and fixedly arranged at the lateral part of the bracket.

U.S. Pat. No. D535,475 issued to Delafontaine discloses a hand bag having an upper opening and side pockets.

U.S. Pat. No. 1,154,815 issued to Soderberg disclosures a vise employing a movable pawl, U.S. Pat. No. 962,376 issued to Miller discloses a door holder employing a plate having a slot and stops attachable to the plate with nuts and bolts, U.S. Pat. No. 970,522 issued to Lundstrom discloses a locking device for follower blocks, and U.S. Pat. No. 1,678,357 issued to Sampson discloses a locking means for index cards and the like.

There is a need for further holders for prescription pill bottles, and more specifically, to prescription pill bottle holders and medical organizer cases therefor.

SUMMARY OF THE INVENTION

In a first aspect, the present invention provides a prescription bottle storage unit for a plurality of prescription pill bottles. The prescription bottle storage unit includes a holder for holding the plurality of prescription pill bottles in fixed positions spaced-apart around a vertically-extending axis so that outwardly-extending side portions of the plurality of prescription pill bottles are observable.

In a second aspect, the present invention provides a prescription bottle storage unit for a plurality of differently sized prescription pill bottles. The prescription bottle storage unit includes a holder having a surface for holding the plurality of differently sized prescription pill bottles in fixed positions vertically spaced-apart around a vertically-extending axis so that outwardly-extending side portions of the plurality of differently sized prescription pill bottles are observable.

In a third aspect, the present invention provides a method for organizing a plurality of prescription pill bottles. The method includes restraining the plurality of spaced-apart prescription pill bottles in fixed positions around a vertically-extending axis so that outwardly-extending side portions of the plurality of prescription pill bottles are observable.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

FIG. 15 is a flowchart of one embodiment of a process for organizing a plurality of prescription pill bottles in accordance with an aspect of the present invention;

DETAILED DESCRIPTION OF THE INVENTION

In one aspect, the present invention is directed to portable prescription bottle storage units and medical organizer cases. For example, in a prescription bottle storage unit, a plurality of prescription bottles may lie horizontally so that a person can easily read a label on a side of the bottle identifying the type of medication in the bottle. The medical organizer case may provide organization and a place for vital medical information and other medical items in one convenient location. In addition, the prescription bottle storage unit may be placed in the medical organizer case. Advantageously, a person may take the unit and case with him or her to a hospital in case of an emergency, to a doctor visit, or on vacation, etc. and have all the necessary medication and information available for proper medical treatments, as well as reduce the likelihood of inadvertent medication mix-ups.

Figure 1:
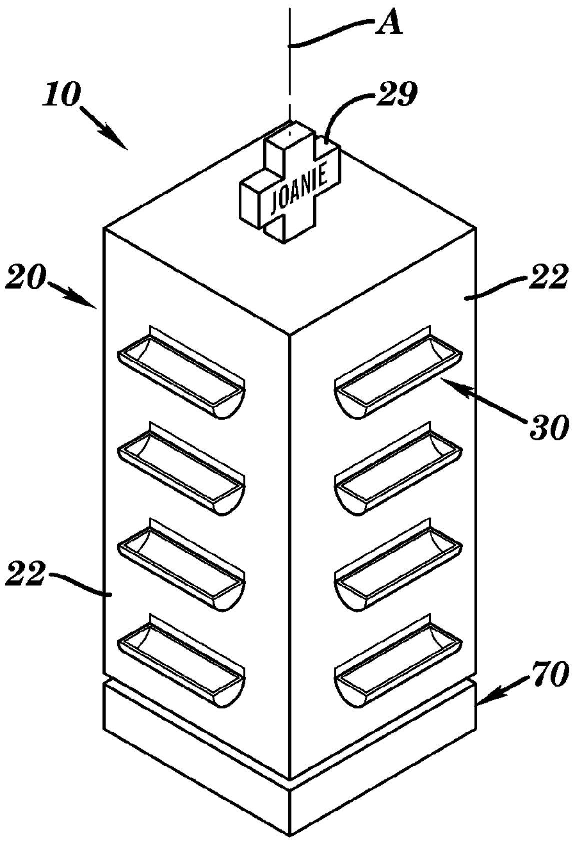
FIG. 1 is a perspective view of an embodiment of a prescription bottle storage unit in accordance with an aspect of the present invention.
Figure 2:
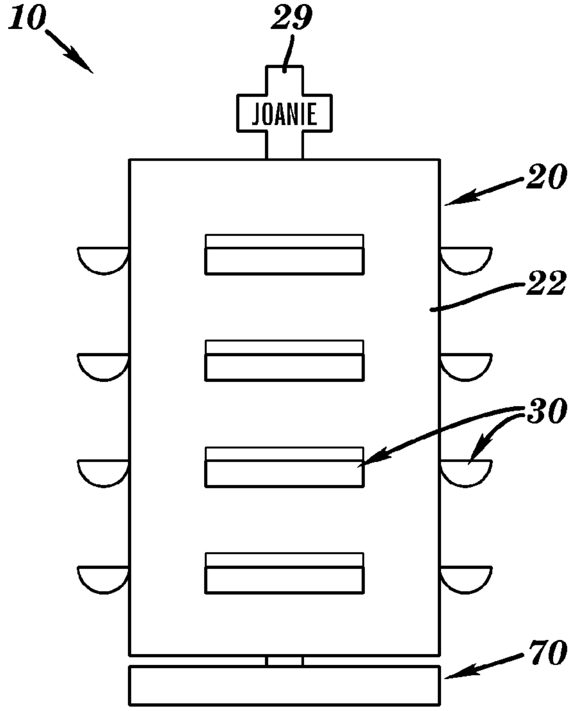
FIG. 2 is a side elevational view of the prescription bottle storage unit of FIG. 1.

FIGS. 1 and 2 illustrate one embodiment of a prescription bottle storage unit 10 in accordance with an aspect of the present invention for holding a plurality of prescription pill bottles (not shown in FIGS. 1 and 2). Prescription bottle storage unit 10 may include a holder 20 and a stand or means 70 for rotatably supporting the holder on a level surface such as a table or a counter.

Figure 3:
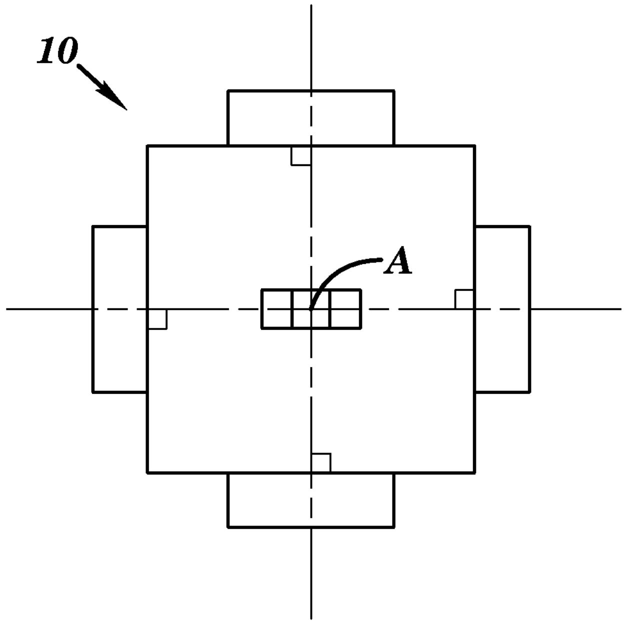
FIG. 3 is a top view of the prescription bottle storage unit of FIG. 1.

Holder 20 may include a plurality of sides 22 having a plurality of means or supports 30 disposed thereon for holding and supporting a plurality of prescription pill bottles (not shown in FIGS. 1 and 2). For example, when viewing the holder from above as shown in FIG. 3, the supports may be disposed thereon generally orthogonally and at a right angle from a central vertically-extending axis A of the holder for horizontally supporting the plurality of prescription pill bottles and operable for viewing an outwardly-extending horizontal side portions of the prescription pill bottles. In one embodiment, the holder may include four vertically-extending planar sides and a plurality of generally horizontally disposed supports attached to the four sides. The planar sides may be disposed at ninety-degrees from each other. Each side may include four supports for a total of sixteen supports for holding sixteen prescription pill bottles.

Figure 4:
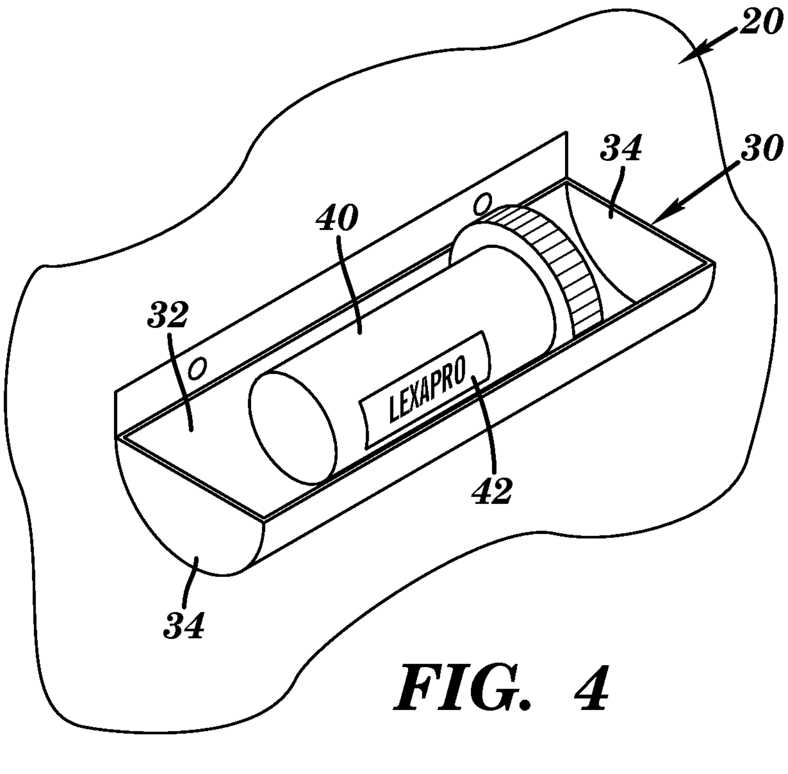
FIG. 4 is an enlarged perspective view of one of the supports of FIG. 1 for holding a prescription pill bottle.

Supports 30 may be crescent shaped or have a curved surface for receiving and supporting the prescription pill bottles. As best shown in FIG. 4, one embodiment of support 30 may include a curved support or surface 32 for supporting a prescription pill bottle 40. The ends of the holder may be closed, e.g., provided with stops 34 for restraining or inhibiting movement of the pill bottle along its length and maintain the pill bottle on the holder. A label 42 having indicia such as the name of the prescription pill contained in the bottle may be placed along the side of the bottle to allow a user to readily identify the bottle.

Figure 5:
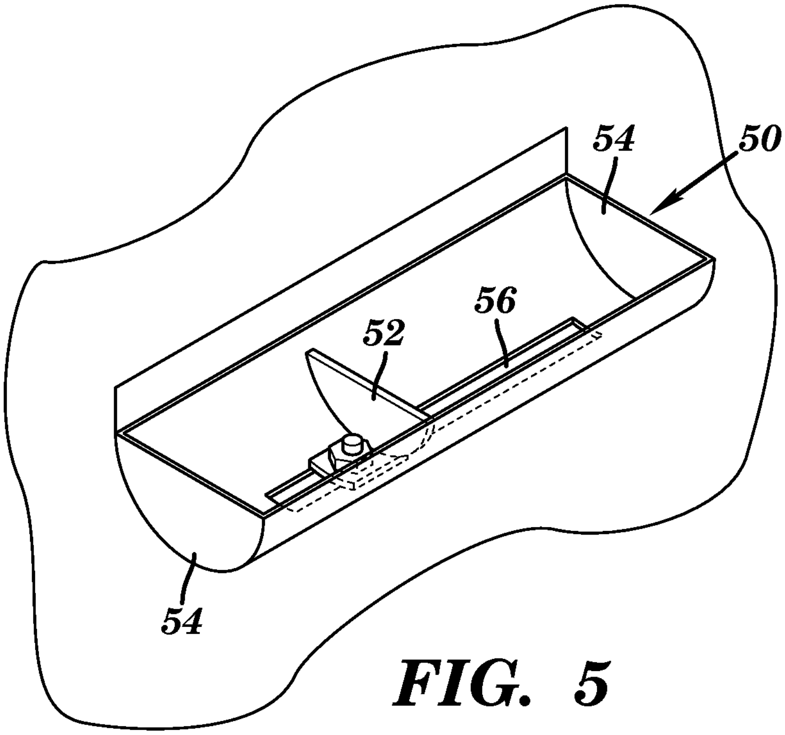
FIG. 5 is a perspective view of another embodiment of a support in accordance with an aspect of the present invention for holding a prescription pill bottle.
Figure 6:
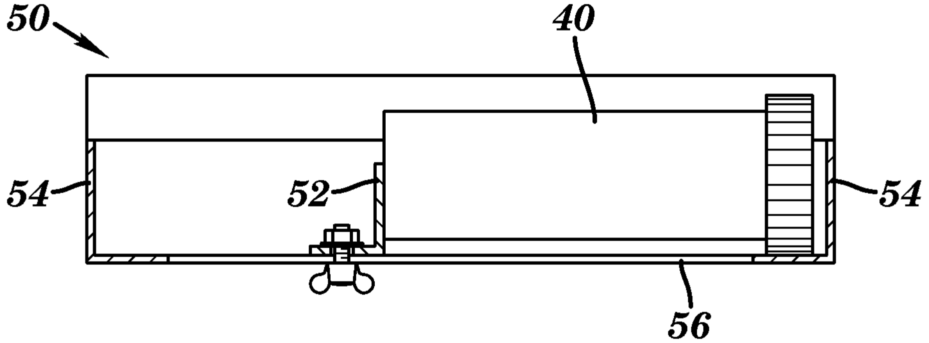
FIG. 6 is a cross-sectional view of the support of FIG. 5.

FIGS. 5 and 6 illustrate another embodiment of a support 50 having an adjustable movable stop 52 for adjustably engaging one of the ends of a prescription pill bottle 40 (FIG. 6). For example, an elongated bolt and wing nut may be operably disposed in a slot 56 to allow a user to clamp and secure prescription pill bottle 40 between adjustable movable stop 52 and fixed stop 54.

Figure 7:
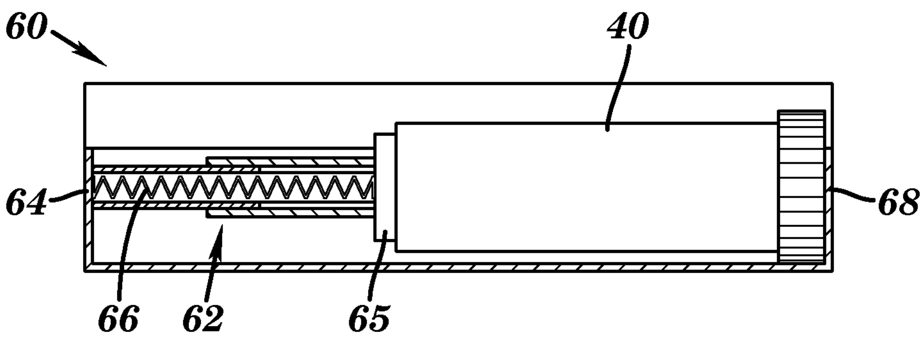
FIG. 7 is a cross-sectional view of another embodiment of a support in accordance with an aspect of the present invention for holding a prescription pill bottle.

FIG. 7 illustrates another embodiment of a support 60 having a biased adjustable movable stop 62 for adjustably biasing one of the ends of the prescription pill bottle. For example, a stop 65 and a spring 66 may be operably employed to allow a user to readily secure prescription pill bottle 40 between stop 65 and stop 68. In one embodiment, the spring may be disposed and contained in telescoping portions which extend between end 64 and stop 65. In another embodiment, the support may include notches which cooperate with a sliding member having a portion which locks into the notches. From the present description, other suitable means for releasably clamping and inhibiting movement of the prescription pill bottles on the supports may be employed.

Figure 8:
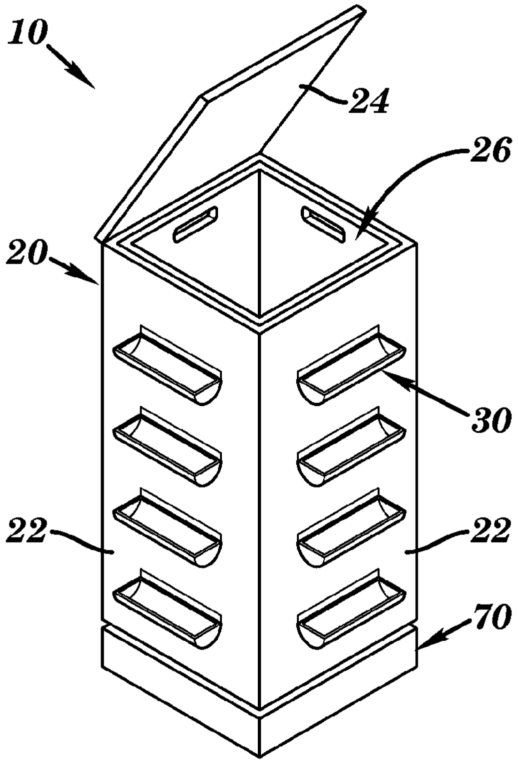
FIG. 8 is a perspective view of the prescription bottle storage unit of FIG. 1 illustrating a lid or top in an open position and showing a chamber therein.

With reference to FIG. 8, prescription bottle storage unit 10 may include a top or cover 24 which may be raised to expose a chamber 26 disposed in and formed by sides 22 of holder 20. Cover 24 may be suitably hinged along one edge to a top edge of one of sides 22. An opposite side edge of cover 24 may be provided with a suitable lock for releasably securing cover 24 to a top edge of side 22 and covering chamber 26.

Figure 9:
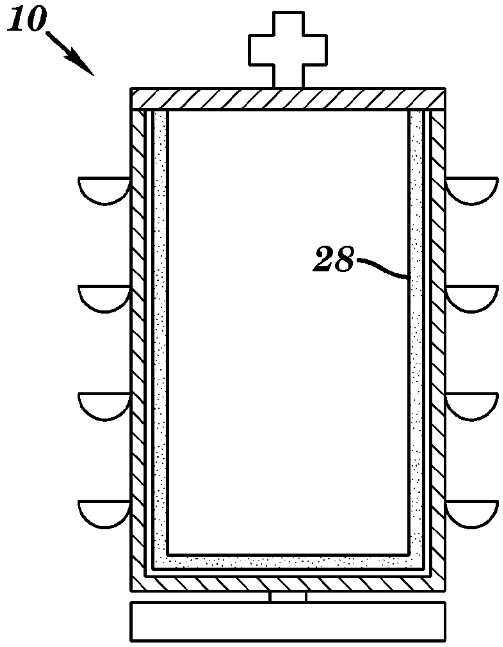
FIG. 9 is a cross-sectional view of the prescription bottle storage unit of FIG. 8 illustrating the chamber therein.

As shown in FIG. 9, disposed in the chamber of the holder may be a removable plastic insulated liner or container 28 to prevent leakage of, for example ice packs, and to provide easy access to items that may be stored in the chamber. For example, insulin may be easily stored in the insulated container along with the ice pack. Other items such as a diabetes case and accessories could also be stored in the central core area as well.

With reference again to FIG. 1, a handle 29 may be disposed along an upper portion of the prescription bottle storage unit for lifting the prescription bottle storage unit. In one embodiment, the handle may have a medical cross-shaped configuration and may include the name of the person corresponding to the prescription pill bottles held in the holder. In addition, the handle may be used to rotate the holder. From the present description, any other handles and shapes may be suitably employed. For example, a strap such as a fabric strap may be employed. A person's name may be disposed or woven into the fabric strap.

In addition, rotatable stand 70 or means for rotating the holder may be disposed along the bottom of the holder. The rotatable stand may be supportable on a level or horizontal surface such as a table or counter so that the holder is rotatable a full 360 degrees. The rotatable stand may include any suitable rotating or pivoting member.

Figure 10:
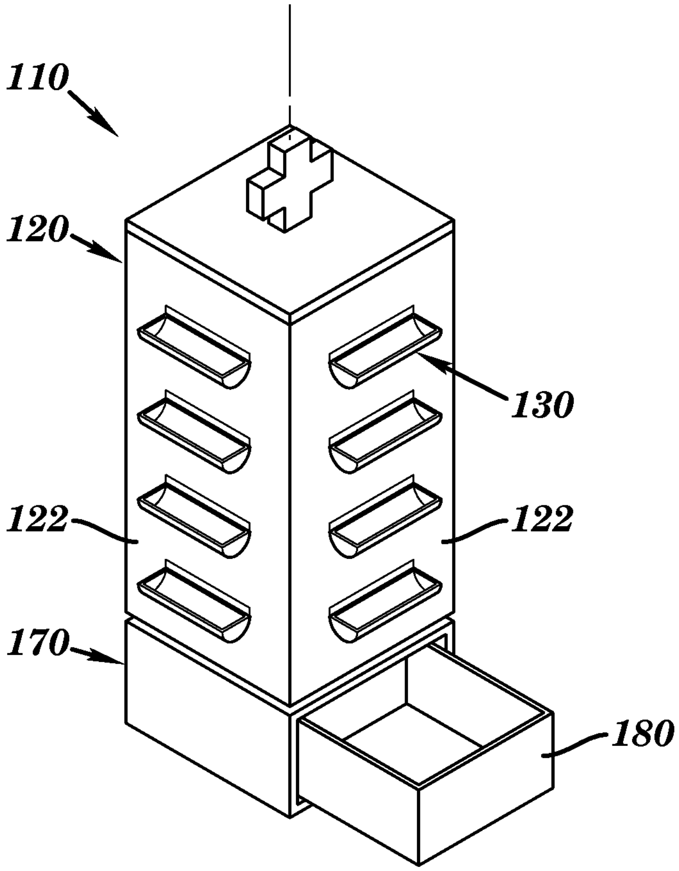
FIG. 10 is a perspective view of another embodiment of a prescription bottle storage unit in accordance with an aspect of the present invention having a drawer.
Figure 11:
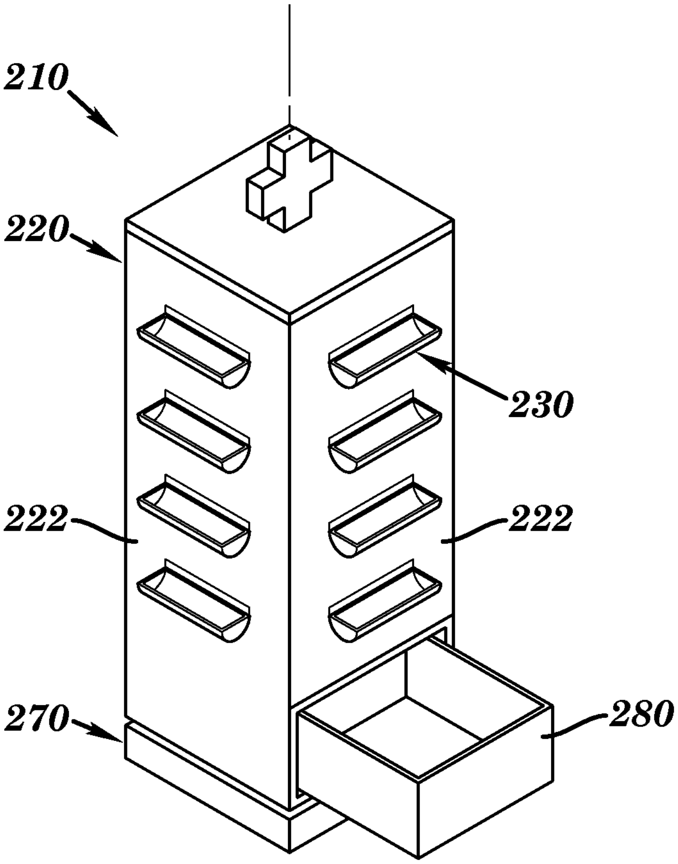
FIG. 11 is a perspective view of another embodiment of a prescription bottle storage unit in accordance with an aspect of the present invention having a drawer.

In another aspect of the present invention, as shown in FIG. 10, a prescription bottle storage unit 110 may include a movable pull out drawer 180 which may be incorporated into the stand. In another aspect of the present invention, as shown in FIG. 11, a prescription bottle storage unit 210 may include a movable pull out drawer 280 which may be incorporated into the sides of the holder. The pull-out drawer section may allow for storage of weekly/monthly pill dispensers and/or other items such as magnifying lenses, eye glasses, etc. The front of the drawer may have a handle such as a recessed handle or an opening to allow a user to easily open the drawer. It is appreciated that other suitable handles may be employed.

From the present description, it will be appreciated that the sides of the holder may have more or less than four sides for holding the prescriptions pill bottles, and the sides may be assembled from separate pieces, or may be formed as an integral monolithic structure. In addition, the sides need not be solid but can have openings therethrough. Further, the holder may have any suitable shape and configuration for holding the prescription pill bottles as described above. The supports may include a curved bottom surface or other surface such as angled surfaces for supporting typically cylindrical or square prescription pill bottles. Further, other structured and disposed supports may be employed which horizontally support the prescription pill bottles on the holder. For example, an elastic strap or a pair of elastic straps may be employed for horizontally supporting a prescription pill bottle on the holder while allowing a user to observe and read a label disposed on an outwardly-extending side portion of the prescription pill bottle.

Figure 12:
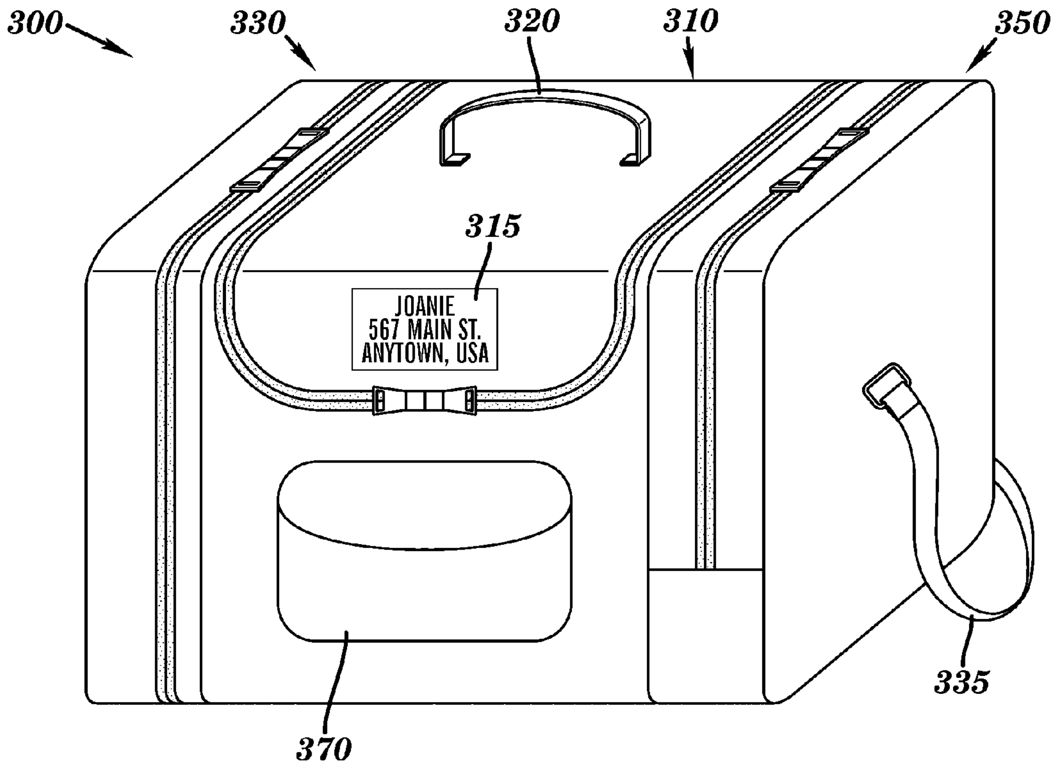
FIG. 12 is a perspective view of an embodiment of a medical organizer case in accordance with an aspect of the present invention.
Figure 13:
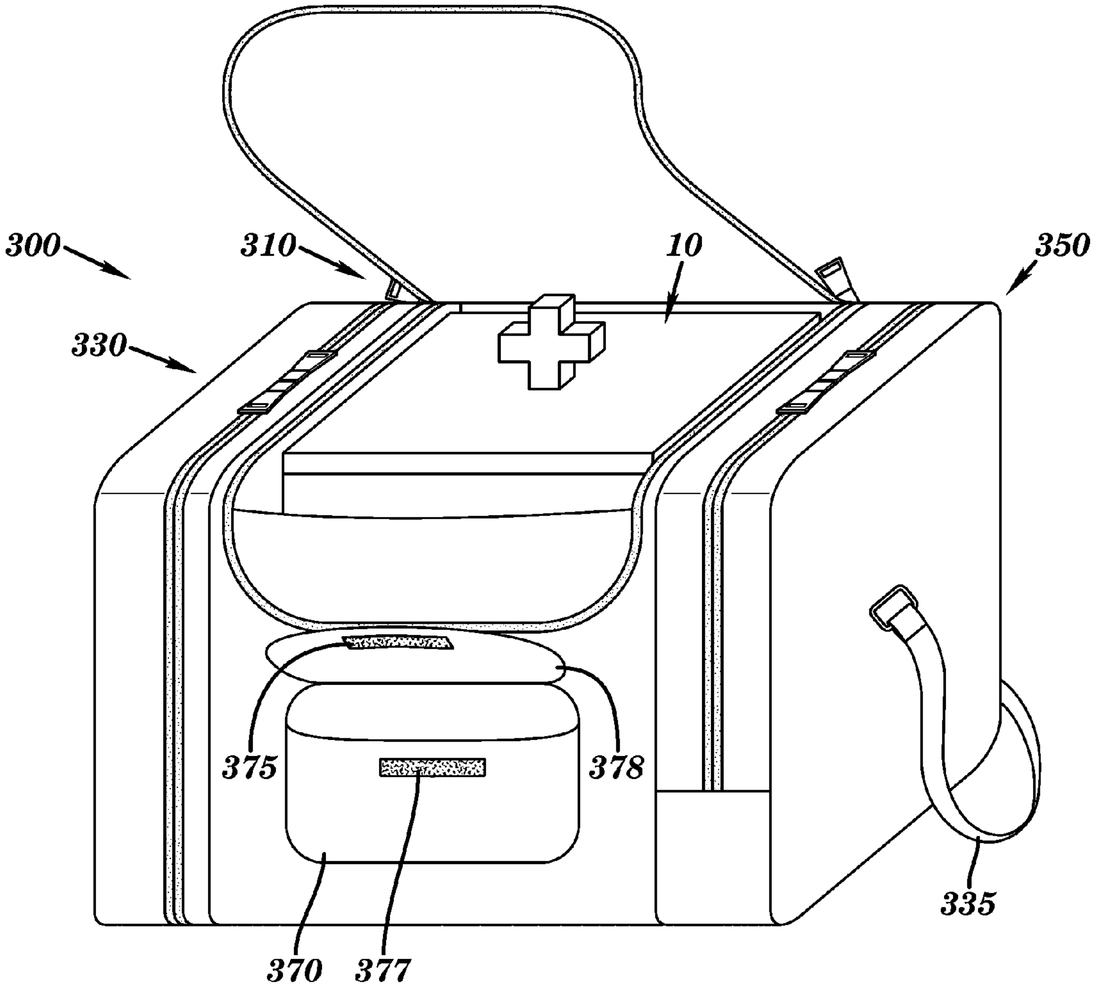
FIG. 13 is a perspective view of the medical organizer case of FIG. 12 with the flap of the center compartment opened showing the prescription bottle storage unit of FIG. 1 therein.
Figure 14:
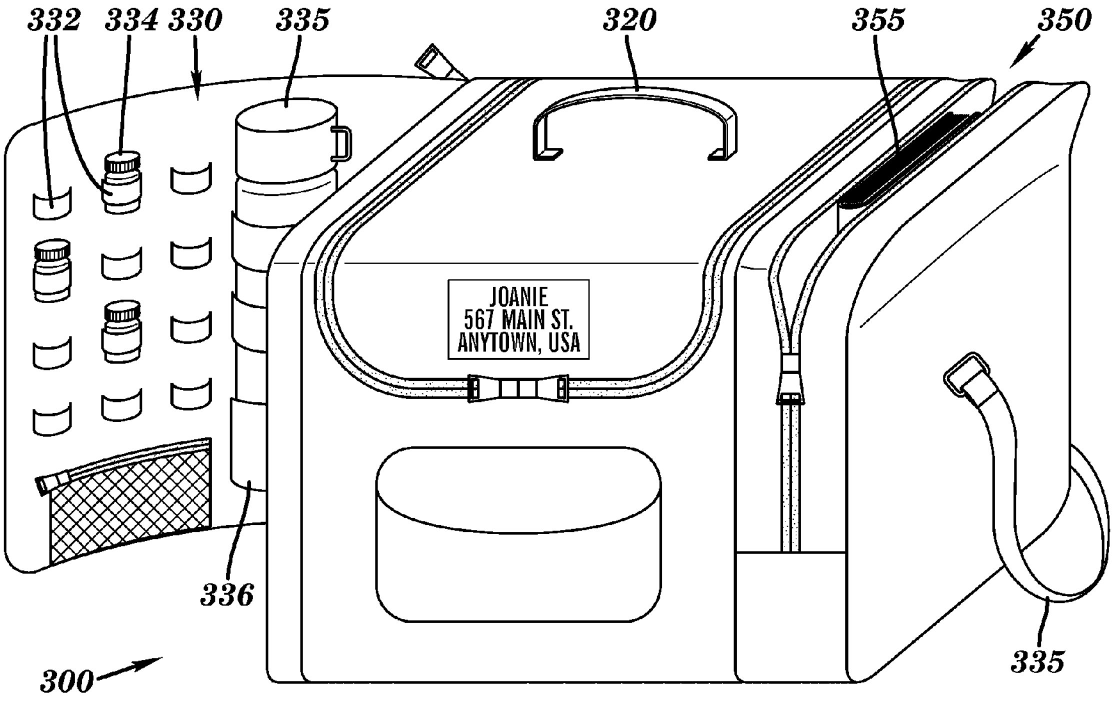
FIG. 14 is a perspective view of the medical organizer case of FIG. 12 with the flaps of the left-hand side compartment and the right-hand side compartment opened.

FIGS. 12-14 illustrate one embodiment of a medical organizer case 300 in accordance with an aspect of the present invention. Generally, the medical organizer case may include a center compartment 310, a left-hand side compartment 330, a right-hand side compartment 350, and a front pouch 370. The various compartments may include a zipper for operably opening and closing the compartments. A handle 320 may be disposed along the top of the center compartment. A shoulder strap 335 may also be provided in which the ends of the strap are attached to the side compartments.

As best shown in FIG. 13, center compartment 310 of medical organizer case 300 defines a chamber for receiving and storing prescription bottle storage unit 10 therein such as when transporting the prescription bottle storage unit. Center compartment 310 is sized and configured for receiving and tightly surrounding and fitting around prescription bottle storage unit 10 so that the prescription bottle storage unit does not move around or topple over and to inhibit the pill bottles from disengaging from the supports when contained in the center compartment, for example, during transport. Front pouch 370 may be disposed on the front of the center compartment and include a flap 378. The front pouch may hold a personal calendar for appointments, a small cardstock card for frequently called numbers (doctors, family members, pharmacies and Rx refill numbers), and a small business card holder (box) for appointment cards and/or health insurance card, etc. Hook-and-loop fasteners 375 and 377 may be employed for releasably closing flap 378.

With reference to FIG. 14, the right-hand side compartment 350 may hold a medical binder 355 and/or other items.

With reference still to FIG. 14, the left-hand side compartment 330 may open to the side and may include a plurality of elastic straps 332 located therein for holding, for example, prescription pill bottles 334, and a water bottle 335 with a built-in cup to put pills in before taking with a drink from the cup. Netting 336 and/or elastic straps may be used for loose items and other pill bottles (liquid), etc., that do not fit into storage unit. The left-hand side compartment may also be large enough for receiving and holding other medical supplies.

With reference again to FIG. 12, the medical organizer case may also include a sewn in pouch 315 with plastic covering for name tag and address.

A decorative cover may be provided for the prescription bottle storage unit when the prescription bottle storage unit is disposed on a counter at a home. A pill checklist for use when filling monthly/weekly pill dispenser which may be easily wiped-off when medications change may also be included.

In addition, each side compartment may be detachable. For example, if a person didn't want to take the binder or the right-hand side compartment he/she could just remove that compartment and carry the other two. The cases may be attachable with, for examples, hook-and-loop fasteners or suitable releasable locking means. Each removable compartment may have a separate carrying handle or a built-in handle. In addition, a medical organizer case may only include a single chamber for containing a prescription bottle storage unit.

FIG. 15 illustrates one embodiment of a method for organizing a plurality of prescription pill bottles in accordance with an aspect of the present invention.

Figure 16:
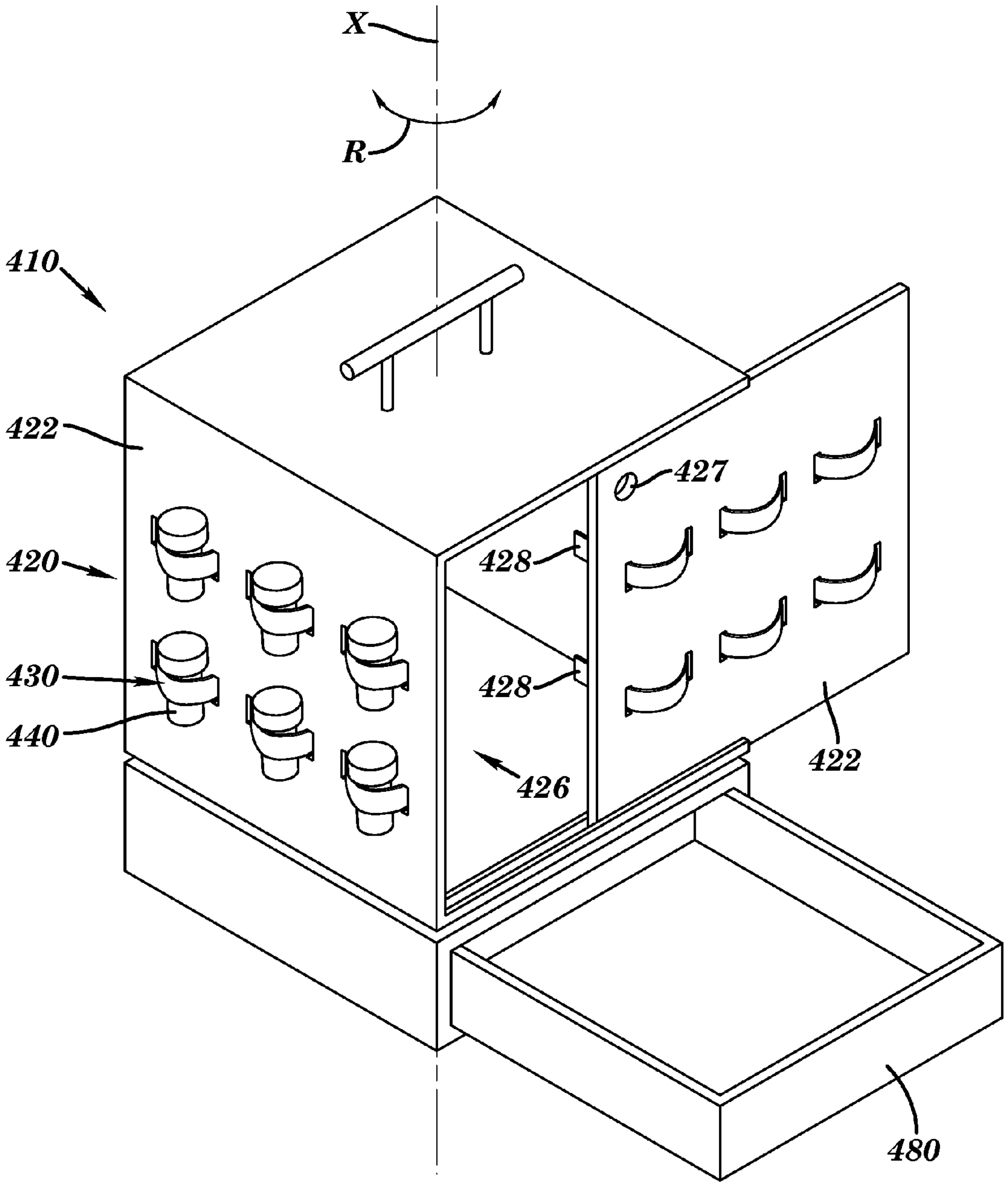
FIG. 16 is a perspective view of another embodiment of a prescription bottle storage unit in accordance with aspects of the present invention.
Figure 17:
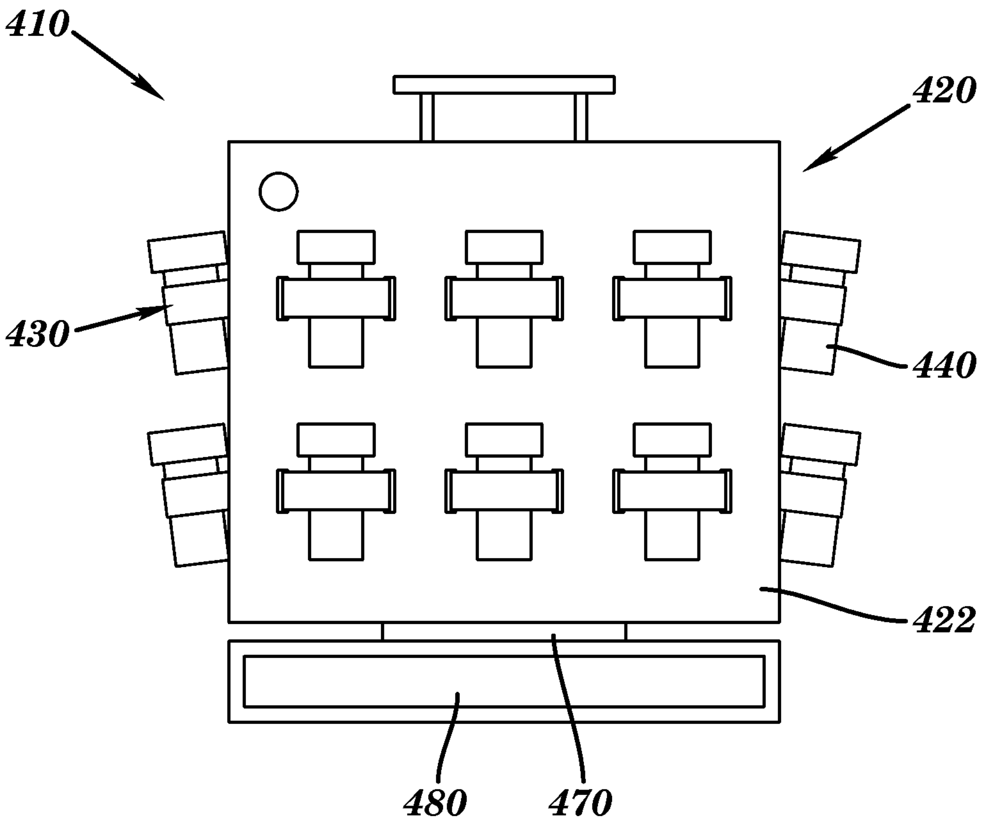
FIG. 17 is a side elevational view of the prescription bottle storage unit of FIG. 16.

FIGS. 16 and 17 illustrate another embodiment of a prescription bottle storage unit 410 in accordance with aspects of the present invention for holding a plurality of prescription pill bottles 440. Prescription bottle storage unit 410 may include a holder 420, a drawer 480, and a stand, turntable, revolvable platform, or rotatable means 470 (FIG. 17) for rotatably supporting the holder. The storage unit may be disposed on a surface of table or counter (not shown). The holder may be rotatable while the drawer remains stationary. As illustrated in FIGS. 16 and 17, the prescription pill bottles may be vertically restrained in fixed positions and rotatable around a vertical center axis X in the direction of double headed arrow R. It will be appreciated that the drawer may be part of the holder, and the stand, turntable, revolvable platform, or rotatable means may be operably attached to the bottom of the storage unit for rotatably supporting the holder and drawer on a surface of a table or a counter.

Figure 18:
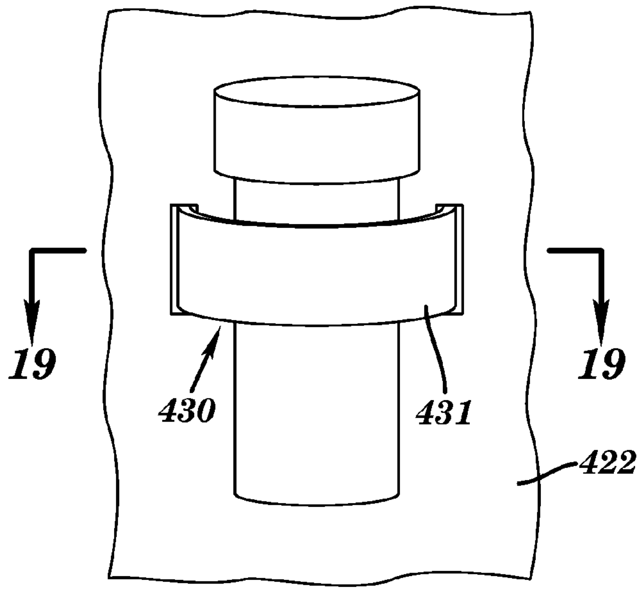
FIG. 18 is an enlarged side elevational view of one of the prescription pill bottles restrained on a portion of the prescription bottle storage unit of FIG. 16.
Figure 19:
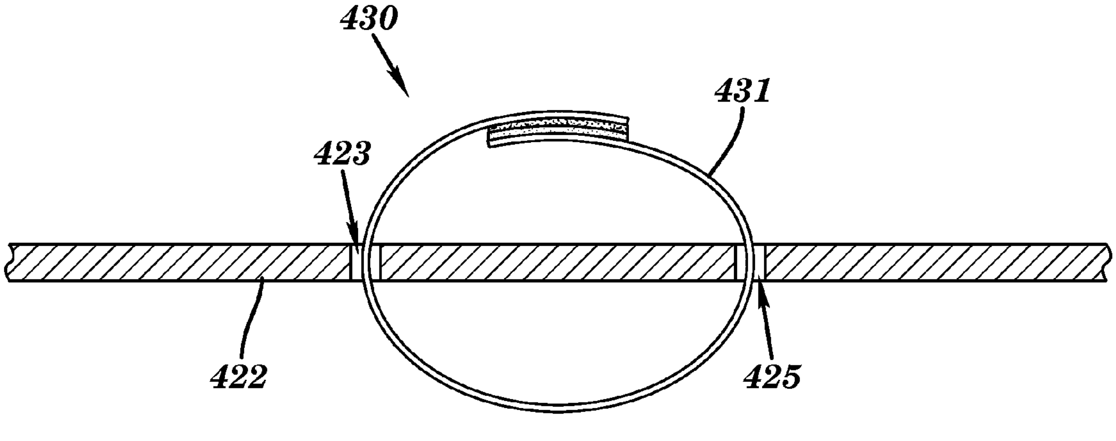
FIG. 19 is a cross-sectional view taken along line 19-19 in FIG. 18.

Holder 420 may include a plurality of sides 422 having a plurality of means or supports 430 disposed thereon for holding and supporting the plurality of prescription pill bottles 440 such as a plurality of differently sized prescription pill bottles. In one configuration, the holder may include four vertically-extending planar sides. The planar sides may be disposed at ninety-degrees from each other. The supports may be disposed on the sides for vertically supporting the plurality of prescription pill bottles and so that the front of the prescription pill bottles are operable for viewing. As best shown in FIGS. 18 and 19, one embodiment of support 430 may include an elastic strap or stretchable band 431 that extends through a pair of cutouts 423 and 425 (FIG. 19) in wall 422. The ends of stretchable band 431 may include operable portions of hook-and-loop fasteners to allow a user to adjust the band to a particular prescription pill bottle. It will be appreciated that the band may be in the form of a continuous stretchable loop, and a user may pull the stretchable loop away from the surface of the side of the holder, and insert the prescription pill bottle. The label identifying the prescription pills contained in the bottle may be placed outwardly so that a user can readily identify the bottle. It will be appreciated that other supports for supporting the prescription pill bottle may be suitably employed. For example, a hook portion of a hook-and-loop fastener may be attached to the side of the holder, and a loop portion of a hook-and-loop fastener may be attached to a prescription pill bottle.

With reference again to FIG. 16, one of sides 422 of prescription bottle storage unit 410 may be a slidable side that allows access a chamber 426 disposed in and formed by sides 422 of holder 420. For example, the slidable side may have upper and lower edges that slide within grooves. An opening 427 may be provided to indicate the slidable side, and allow a user to open and close the slidable side. One or more stops 428 may be disposed on the back side of the slidable side to inhibit the slidable side from being removed from the prescription bottle storage unit 410. Other means for opening and closing the slidable side may be employed. For example, a handle may be provided on the slidable side to allow a user to easily open and close the slidable side, or a cutout may be provided along the vertical edge of the slidable side. In other embodiments, one of the sides may be hingedly attached allowing access to a chamber disposed and formed in the holder, or the holder may have a top or cover that is hingedly attached which may be raised to expose a chamber disposed in and formed in the holder. In addition, the top may be slidably attached to the holder, e.g., in grooves disposed along the top of the sides to allow access to a chamber disposed and formed in the holder. Suitable stops may be proved to inhibit the top from sliding and disconnecting completely from the sides. Alternatively, the top may also include operable posts or pins disposed along the back side of the top that allow the top to pivot and angle downwardly when open.

A removable plastic insulated liner or container (not shown in FIG. 16) may be disposed in the chamber in the prescription bottle storage unit. For example, insulin may be easily stored in the insulated container along with an ice pack. The chamber in the prescription bottle storage unit may hold a variety of items, individually customizable for the needs of the patient. Some examples of items that may be stored in the chamber of the unit may include but are not limited to: insulated lunch bags (to keep insulin cold or lunch items cold), diabetes supplies (case with test strips, lancets, meter, etc.), other medical items such as inhalers, and still other items and combinations thereof.

While each side of prescription pill bottle storage unit 410 is illustrated as having two rows of supports for supporting prescription pill bottles, it will be appreciated that other configuration may be equally suitable. For example, a prescription bottle storage unit may have smaller height and a larger width than that illustrated in FIG. 16 and have the prescription pill bottles disposed in a single row around the vertically-extending axis of the holder. It will be appreciated that the pill bottles may be disposed on at least two sides of the holder. In addition, the holder may be sized so that when the prescription pill bottles are restrained, the tops of the prescription pill bottles extend above the top of the holder. Further, the holder may be operable to hold any number of prescription pill bottles, and the prescription pill bottles may be restrained vertically, horizontally, on an angle, or combinations thereof. For example, the sides or walls of the unit may be short in height, having only four elastic holders lined up horizontally in a row to hold four prescription bottles, or, the sides or wall may be taller and narrower with multiple rows of elastic holders so that the prescription bottles may be stacked above each other with room between bottles for access to each bottle.

The sides of the support may be a clear or a translucent material allowing a user to view the contents stored in chamber 426. The sides may be opaque, or a combination of clear, translucent or opaque.

While each of the side of prescription bottle storage unit is illustrated as being flat, it will be appreciated that the sides of prescription bottle storage unit may have more or less sides than that shown in FIG. 16. In addition, the side or sides of the prescription bottle storage unit may have a curved outer surface, e.g., have a cylindrical outer surface to which the prescription pill bottles are restrained. The holder may include other shapes and sizes for a continuous surface or surfaces that extends around the vertical axis and in which the prescription pill bottles are restrained against.

Prescription bottle storage unit 410 may be operably received in a medical organizer case such as described above. The medical organizer case further may include at least one side compartment for containing a binder receivable in at least one side compartment.

From the present description, it will be appreciated that if a person is unconscious, or in any other way incapacitated, to relay information to an emergency room doctor about his/her doctor's names, medicines he/she is on, past medical history etc., the storage unit/case of the present invention will help medical personnel to assist the patient, even if family members are present and do not know the information themselves. Also, storage unit/case of the present invention provides all the information for medical personnel especially when it is difficult to relay information under stressful situations, such as an emergency room visit, when time was of the essence.

The storage unit/case/binder allows family members to stay with the patient and need not answer questions from doctors/nurses, because the doctors and/or medical personnel can go through the unit and binder independently to extract relevant medical information.

If medical personnel go to a home where a person lives alone, or if family members are not present to assist in relaying medical information, the storage unit/case/binder would have all the vital information in it. The medical binder in side compartment 350 may also contain business cards with phone and fax numbers of all doctors, medical history, medication lists, emergency family contact phone numbers, living will, power of attorney, DNR's etc.

The case can be locked or stored in a locked area with medications to reduce the misuse/accidental ingestion of medicines by young children and/or theft of the medication by older children.

Thus, while various embodiments of the present invention have been illustrated and described, it will be appreciated to those skilled in the art that many changes and modifications may be made thereunto without departing from the spirit and scope of the invention.

The invention claimed is:

1. A method for organizing a plurality of differently sized prescription pill bottles, the method comprising:

obtaining the plurality of differently sized prescription pill bottles;

releasably and biasly engaging outer portions of the plurality of differently sized prescription pill bottles to fixedly restrain the plurality of differently sized prescription pill bottles adjacent to and outwardly from a vertically extending surface disposed around a vertically-extending axis defining a chamber therein having an openable member for accessing said chamber and so that the plurality of fixedly restrained differently sized prescription pill bottles is spaced apart around the vertically-extending surface and the vertically-extending axis;

placing outwardly-extending side portions of the spaced apart plurality of fixedly restrained differently sized prescription pill bottles so that labels identifying the prescription are observable; and wherein the releasably and biasly engaging comprises fixedly restraining the plurality of differently sized spaced-apart prescription pill bottles against the surface using elastic bands, the elastic bands comprise releasably attachable ends, and the surface comprising openings therethrough for operably receiving the plurality of elastic bands.

2. The method of claim 1 further comprising rotating the plurality of fixedly restrained spaced-apart differently sized prescription pill bottles about the vertically-extending axis.

3. The method of claim 1 further comprising rotating the plurality of fixedly restrained spaced-apart differently sized prescription pill bottles about the vertically-extending axis while a drawer operably attached to the plurality of fixedly restrained spaced-apart prescription pill bottles remains stationary.

4. The method of claim 1 wherein the releasably and biasly engaging is operable to fixedly restrain the plurality of differently sized spaced-apart prescription pill bottles vertically.

5. The method of claim 1 wherein the releasably and biasly engaging is operable to fixedly restrain the plurality of differently sized spaced-apart prescription pill bottles horizontally.

6. The method of claim 1 wherein the releasably and biasly engaging is operable to fixedly restrain the plurality of differently sized spaced-apart prescription pill bottles using elastic bands.

7. The method of claim 1 further comprising transporting the plurality of fixedly restrained differently sized spaced-apart prescription pill bottles from a first location to a second location remote from the first location.

8. The method of claim 1 wherein the releasably and biasly engaging is operable to fixedly restrain the plurality of differently sized spaced-apart prescription pill bottles along a front side, a left side, a right side, and a rear side disposed around the vertically-extending axis, and wherein a slidable member defines one of the sides and operable for accessing the chamber.

9. The method of claim 1 wherein the releasably and biasly engaging is operable to fixedly restrain the plurality of differently sized spaced-apart prescription pill bottles along a front side, a left side, a right side, and a rear side disposed around the vertically-extending axis.

10. The method of claim 1 wherein the releasably and biasly engaging is operable to fixedly restrain the plurality of differently sized spaced-apart prescription pill bottles adjacent the surface extending continuously around the vertically-extending axis.

11. The method of claim 1 further comprising accessing the chamber disposed between the plurality of fixedly restrained differently sized spaced-apart prescription pill bottles.

12. The method of claim 11 further comprising cooling the chamber.

13. The method of claim 11 wherein the accessing comprising opening the member for accessing said chamber.

14. The method of claim 11 further comprising locking access to the chamber.

15. The method of claim 13 further comprising locking the opening member and unlocking the opening member to access the chamber.

16. The method of claim 1 further comprising placing the plurality of fixedly restrained differently sized spaced-apart prescription pill bottles in a medical organizer case.

17. The method of claim 16 wherein the medical organizer case comprises a compartment sized and configured for tightly receiving the fixedly restrained plurality of differently sized spaced-apart prescription pill bottles.

18. The method of claim 17 further comprising transporting the medical organizer case containing the plurality of fixedly restrained differently sized spaced-apart prescription pill bottles from a first location to a second location remote from the first location.

19. The method of claim 17 wherein the medical organizer case comprises at least one side compartment, and further comprising a binder receivable in the at least one side compartment.

20. The method of claim 16 wherein the releasably and biasly engaging is operable to fixedly restrain the plurality of differently sized spaced-apart prescription pill bottles along a front side, a left side, a right side, and a rear side disposed around the vertically-extending axis.

21. The method of claim 1 further comprising supporting the plurality of fixedly restrained spaced-apart differently sized prescription pill bottles on a table or a counter.

22. The method of claim 2 further comprising supporting the plurality of rotatable fixedly restrained spaced-apart differently sized prescription pill bottles on a table or a counter.

23. The method of claim 1 wherein the releasably and biasly engaging is operable to fixedly restrain the plurality of differently sized spaced-apart prescription pill bottles against the surface extending continuously around the vertically-extending axis.

24. The method of claim 23 further comprising accessing the chamber defined by the surface.

25. The method of claim 24 further comprising accessing an opening member to access the chamber.

* * * * *